(12) United States Patent
Fukumaru et al.

(10) Patent No.: US 8,988,027 B2
(45) Date of Patent: Mar. 24, 2015

(54) MOTOR CONTROL APPARATUS AND MOTOR CONTROL METHOD

(71) Applicant: Kabushiki Kaisha Yaskawa Denki, Kitakyushu-shi (JP)

(72) Inventors: Shingo Fukumaru, Fukuoka (JP); Shinya Morimoto, Fukuoka (JP); Hideaki Iura, Fukuoka (JP); Akira Yamazaki, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 214 days.

(21) Appl. No.: 13/792,201

(22) Filed: Mar. 11, 2013

(65) Prior Publication Data

US 2014/0049202 A1 Feb. 20, 2014

(30) Foreign Application Priority Data

Aug. 17, 2012 (JP) ................. 2012-181129

(51) Int. Cl.
| H02P 1/04 | (2006.01) |
| H02P 21/14 | (2006.01) |
| H02P 21/00 | (2006.01) |

(52) U.S. Cl.
CPC .......... H02P 21/146 (2013.01); H02P 21/0039 (2013.01); H02P 21/148 (2013.01)
USPC ................. 318/400.33; 318/400.02; 318/715; 318/721; 318/799; 318/400.32

(58) Field of Classification Search
USPC ............. 318/400.01, 400.02, 400.07, 400.14, 318/400.15, 400.32, 400.33, 400.34, 430, 318/432, 434, 437, 700, 705, 715, 721, 779, 318/799, 801, 805, 806, 807, 808, 809
See application file for complete search history.

(56) References Cited

U.S. PATENT DOCUMENTS

| 7,157,876 B2* | 1/2007 | Ide et al. .................. 318/400.04 |
| 8,330,402 B2* | 12/2012 | Ide et al. .................. 318/400.02 |
| 2004/0232862 A1* | 11/2004 | Wogari et al. ................. 318/254 |
| 2009/0039810 A1* | 2/2009 | Gotz et al. ............... 318/400.32 |

FOREIGN PATENT DOCUMENTS

| JP | 2008-92657 | 4/2008 |
| JP | 2009-291072 | 12/2009 |
| JP | 2011-41343 | 2/2011 |

OTHER PUBLICATIONS

Japanese Office Action for corresponding JP Application No. 2012-181129, Apr. 1, 2014.
Taiwanese Office Action for corresponding TW Application No. 102108057, Nov. 3, 2014.

* cited by examiner

*Primary Examiner* — Anthony M Paul
(74) *Attorney, Agent, or Firm* — Mori & Ward, LLP

(57) ABSTRACT

A motor control apparatus according to the embodiment includes a rotational position estimating unit, a change amount estimating unit, and an inductance estimating unit. The rotational position estimating unit estimates a rotational position of a rotor from a motor parameter including a q-axis inductance of a motor on a basis of an output current to the motor and a voltage reference. The change amount estimating unit estimates a change amount of an output torque with respect to a current phase change of the motor corresponding to a high frequency signal whose frequency is higher than a drive frequency of the motor. The inductance estimating unit estimates an inductance value that obtains a maximum torque on a basis of the change amount as the q-axis inductance.

10 Claims, 6 Drawing Sheets

MOTOR CONTROL APPARATUS AND MOTOR CONTROL METHOD

CROSS-REFERENCE TO RELATED APPLICATION

This application is based upon and claims the benefit of priority of the prior Japanese Patent Application No. 2012-181129, filed on Aug. 17, 2012, the entire contents of which are incorporated herein by reference.

FIELD

The embodiment discussed herein is directed to a motor control apparatus and a motor control method.

BACKGROUND

Recently, a motor control apparatus has been put to practical use that includes a speed estimator that estimates the rotational speed of a motor from an induced voltage generated by the rotation of the motor and perform sensorless control. In this type of the motor control apparatus, there is known a motor control apparatus that performs maximum torque control in which the reluctance torque is effectively used. The maximum torque control is performed by using a speed estimated error generated by intentionally inducing an error in the true value of a q-axis inductance, which is used by the speed estimator for calculation, and causing the control axis to match the maximum torque operating point.

First and second methods are disclosed in Japanese Patent Application Laid-open No. 2009-291072 as a method of shifting the q-axis inductance, which is a parameter for calculation in the speed estimator, from its true value. The first method is a method that uses a parameter L for calculation, which is set to a value satisfying $L_d \leq L < L_q$. The second method is a method that introduces a dm-qm coordinate system, in which the rotational axis, whose direction matches the direction of the current vector that realizes the maximum torque control, is the qm axis and the rotational axis orthogonal to the qm axis is the dm axis, and that uses a parameter Lm for calculation. Motor parameters Ld, Lq, and Φa are used for calculating the parameter Lm for calculation.

However, the first method has a problem in that because the parameter L for calculation is a fixed value, the accuracy of the maximum torque control is reduced as the load increases.

In the second method, the parameter Lm for calculation is a function of the q-axis inductance; therefore, the second method can improve the first method. However, because the motor parameters (Ld, Lq, and Φa) are used for calculating the parameter Lm for calculation, if there is an error in the initial setting value or the motor parameters change due to temperature or load, an error occurs in the parameter Lm for calculation in accordance with the error in the motor parameters. Therefore, there is a problem in that the maximum torque control cannot be obtained and moreover the speed estimator becomes unstable.

SUMMARY

A motor control apparatus according to the embodiment includes a current reference generating unit, a current detecting unit, a voltage reference generating unit, a drive unit, a rotational position estimating unit, a change amount estimating unit, and an inductance estimating unit. The current reference generating unit generates a current reference, in which a high frequency signal whose frequency is higher than a drive frequency of a motor is superposed. The current detecting unit detects an output current to the motor from the drive unit. The voltage reference generating unit generates a voltage reference on a basis of a deviation between the current reference and the output current. The drive unit drives the motor on a basis of the voltage reference. The rotational position estimating unit estimates a rotational position of a rotor from a motor parameter including a q-axis inductance of the motor on a basis of the output current and the voltage reference. The change amount estimating unit estimates a change amount of an output torque with respect to a current phase change of the motor corresponding to the high frequency signal. The inductance estimating unit estimates an inductance value that obtains a maximum torque on a basis of the change amount of the output torque with respect to a current phase change and sets the inductance value in the rotational position estimating unit as the q-axis inductance.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, an embodiment of a motor control apparatus and a motor control method disclosed in the present application will be described in detail with reference to the accompanying drawings. This invention is not limited to the following embodiment.

Figure 1:
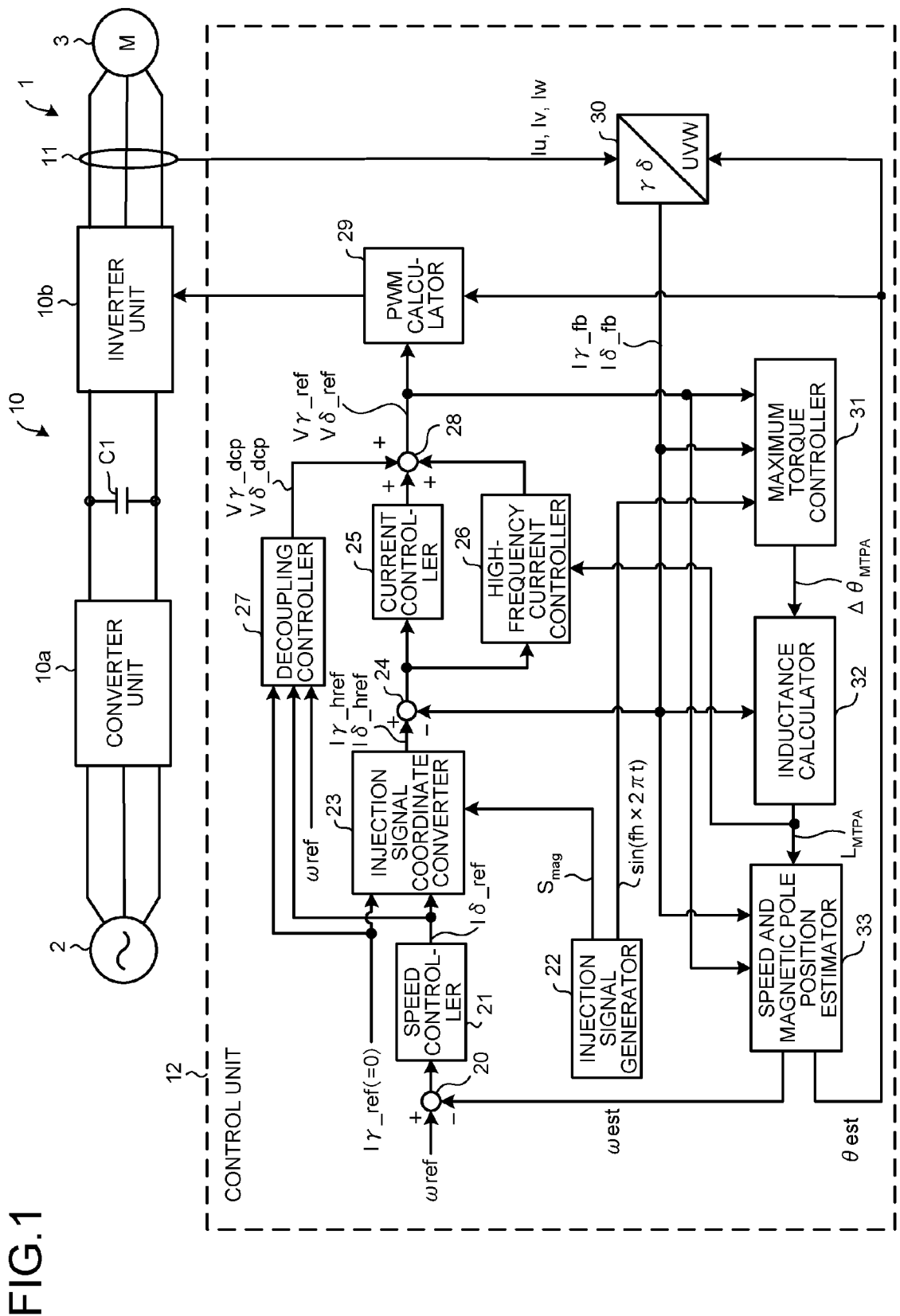
FIG. 1 is a diagram illustrating a configuration of a motor control apparatus according to an embodiment.

FIG. 1 is a diagram illustrating a configuration of a motor control apparatus according to an embodiment. As illustrated in FIG. 1, a motor control apparatus 1 according to the embodiment is connected between an AC source 2 and an AC motor 3. The motor control apparatus 1 extracts power necessary for driving the AC motor 3 from the AC source 2 and supplies it to the AC motor 3. The AC motor 3 is, for example, an interior permanent magnet synchronous motor (IPMSM).

The motor control apparatus 1 includes a power converting unit 10, an output current detecting unit 11, and a control unit 12. The power converting unit 10 includes a converter unit 10a, an inverter unit 10b, and a smoothing capacitor C1, and supplies the power supplied from the AC source 2 to the AC motor 3 after AC-AC conversion. The power converting unit 10 is an example of the drive unit and the output current detecting unit 11 is an example of the current detecting unit.

The converter unit 10a, for example, includes a rectifier circuit and rectifies the AC voltage supplied from the AC source 2. The voltage rectified by the converter unit 10a is smoothed by the smoothing capacitor C1 so as to be converted to a DC voltage. The inverter unit 10b, for example, includes two upper and lower switching elements for each phase of the output phase and supplies the DC voltage output from the converter unit 10a to the AC motor 3 after converting it to an AC voltage by the switching elements. The AC motor 3 is driven by the AC voltage output from the inverter unit 10b. The switching element is, for example, an IGBT (Insulated Gate Bipolar Transistor) or a MOSFET.

The output current detecting unit 11 detects the output current flowing to the AC motor 3 from the inverter unit 10b. Specifically, the output current detecting unit 11 detects instantaneous values Iu, Iv, and Iw (hereinafter, described as output current values Iu, Iv, and Iw) of the output current flowing to the AC motor 3 from the U phase, V phase, and W phase, which are output phases of the inverter unit 10b, respectively. The output current detecting unit 11 is, for example, a current sensor that detects current by utilizing a Hall element that is a magnetoelectric converting element.

The control unit 12 outputs a voltage having desired amplitude and frequency from the inverter unit 10b by controlling each switching element of the inverter unit 10b, thereby driving the AC motor 3.

The control unit 12 includes subtractors 20 and 24, a speed controller 21, a injection signal generator 22, a injection signal coordinate converter 23, a current controller 25, a high-frequency current controller 26, a decoupling controller 27, an adder 28, and a PWM calculator 29. Furthermore, the control unit 12 includes a coordinate converter 30, a maximum torque controller 31, an inductance calculator 32, and a speed and magnetic pole position estimator 33.

The injection signal coordinate converter 23 is an example of the current reference generating unit and the current controller 25, the high-frequency current controller 26, the decoupling controller 27, and the adder 28 are an example of the voltage reference generating unit. Moreover, the maximum torque controller 31 is an example of the change amount estimating unit, the inductance calculator 32 is an example of the inductance estimating unit, and the speed and magnetic pole position estimator 33 is an example of the rotational position estimating unit and the angular frequency estimating unit.

The subtractor 20 obtains a deviation between a rotor angular frequency reference ωref and a rotor angular frequency estimated value ωest and outputs it to the speed controller 21. The rotor angular frequency reference ωref is a reference that defines the angular frequency (hereinafter, described as the rotor angular frequency) of the rotor included in the AC motor 3 and is input from a not-shown upper-level control apparatus. "est" indicates that it is an estimated value.

The speed controller 21, for example, includes a PI (Proportional Integral) controller and generates a δ-axis current reference Iδ_ref by PI control such that the deviation between the rotor angular frequency reference ωref and the rotor angular frequency estimated value ωest becomes zero. The δ-axis current reference Iδ_ref is output from the speed controller 21 to the injection signal coordinate converter 23 and the decoupling controller 27.

The injection signal generator 22 generates a injection signal $S_{mag}$, which is a high frequency signal, and outputs it to the injection signal coordinate converter 23. The injection signal $S_{mag}$ is a signal defined by $A_{mag} \sin(fh \times 2\pi t)$. Moreover, the injection signal generator 22 outputs a signal $\sin(fh \times 2\pi t)$ to the maximum torque controller 31. "fh" indicates the frequency of the injection signal $S_{mag}$ and is set to a value higher than the frequency of the voltage that drives the AC motor 3.

Moreover, $A_{mag}$ is an amplitude of a phase of a current reference vector Is defined by a γ-axis current reference Iγ_ref and the δ-axis current reference Iδ_ref. The frequency fh and the amplitude $A_{mag}$ of the injection signal $S_{mag}$ are set not to interfere in consideration of the control response of the speed controller 21 and the switching frequency of the inverter unit 10b.

In the present embodiment, in the rotating coordinate system that rotates at the same speed as the rotational speed of the magnetic flux generated by permanent magnets arranged in the rotor of the AC motor 3, the direction of the magnetic flux generated by the permanent magnets is defined as the d-axis and the rotational axis for control corresponding to the d-axis is defined as the γ-axis. Moreover, the phase advanced by 90° in an electrical angle from the d-axis is defined as the q-axis and the rotational axis for control corresponding to the q-axis is defined as the δ-axis.

The injection signal coordinate converter 23 obtains γδ-axis current references Iγ_href and Iδ_href when the phase of the current reference vector Is is varied by the injection signal $S_{mag}$ by the following Equation (1) and outputs them to the subtractor 24. The γ-axis current reference Iγ_ref is, for example, set to zero.

$$\begin{bmatrix} I\gamma\_href \\ I\delta\_href \end{bmatrix} = \begin{bmatrix} \cos(A_{mag}\sin(fh \times 2\pi t)) & -\sin(A_{mag}\sin(fh \times 2\pi t)) \\ \sin(A_{mag}\sin(fh \times 2\pi t)) & \cos(A_{mag}\sin(fh \times 2\pi t)) \end{bmatrix} \begin{bmatrix} I\gamma\_ref \\ I\delta\_ref \end{bmatrix} \quad (1)$$

The subtractor 24 subtracts a γ-axis current detected value Iγ_fb to be described later from the γ-axis current reference Iγ_href on which the injection signal $S_{mag}$ is superposed. Moreover, the subtractor 24 subtracts a δ-axis current detected value Iδ_fb to be described later from the δ-axis current reference Iδ_href on which the injection signal $S_{mag}$ is superposed. Then, the subtractor 24 outputs each subtraction result to the current controller 25 and the high-frequency current controller 26.

The current controller 25 generates a γ-axis voltage reference Vγ and a δ-axis voltage reference Vδ such that a deviation between the γ-axis current reference Iγ_href and the γ-axis current detected value Iγ_fb and a deviation between the δ-axis current reference Iδ_href and the δ-axis current detected value Iδ_fb each become zero. The current controller 25 is, for example, composed of a PI controller. The current controller 25 outputs the generated γ-axis voltage reference Vγ and δ-axis voltage reference Vδ to the adder 28.

The high-frequency current controller 26 generates γδ-axis voltage references Vγ_href and Vδ_href such that a deviation between the γδ-axis current references and the γδ-axis current detected values becomes zero. The above-described injection signal $S_{mag}$ is a relatively high-frequency wave; therefore, the high-frequency current controller 26, which is highly responsive compared with a normal current control, is provided to cause the current value to follow the injection signal $S_{mag}$.

The high-frequency current controller 26 is, for example, composed of a P (proportional) controller, thereby maintaining the stability.

Figure 2:
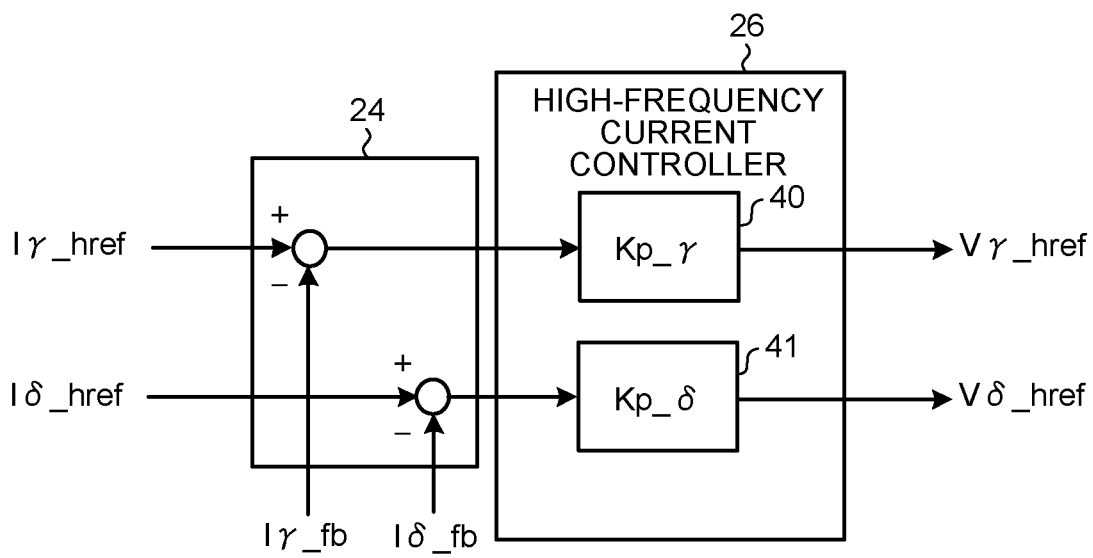
FIG. 2 is a diagram illustrating a configuration example of a high-frequency current controller.

FIG. 2 is a diagram illustrating a configuration example of the high-frequency current controller 26. As illustrated in FIG. 2, the high-frequency current controller 26 includes P controllers 40 and 41. Proportional gains Kp_γ and Kp_δ of the P controller 40 are obtained by the following Equation (2). In the following Equation (2), $\omega_{ACR\_hf}$ is the configuration parameter and is, for example, set to a value obtained by multiplying the cutoff frequency in the high-frequency current control by 2π.

$$Kp\_\gamma = L_{MTPA} \times \omega_{ACR\_hf}$$

$$Kp\_\delta = L_{MTPA} \times \omega_{ACR\_hf} \quad (2)$$

The high-frequency current controller 26 updates an inductance value used for calculating the proportional gains Kp_γ and Kp_δ online by an inductance compensation value $L_{MTPA}$ from the inductance calculator 32. Consequently, it is possible to reduce the change in the current response due to the setting error of the inductance. In terms of the current controller 25 and the decoupling controller 27, the parameters are not updated online to maintain the stability. The term online indicates the state where the motor control apparatus 1 is operating.

The P controller 40 has the above-described proportional gain Kp_γ and generates the γ-axis voltage reference Vγ_href by proportional control such that a deviation between the γ-axis current reference Iγ_href and the γ-axis current detected value Iγ_fb becomes zero. Moreover, the P controller 41 has the above-described proportional gain Kp_δ and generates the δ-axis voltage reference Vδ_href by proportional control such that a deviation between the δ-axis current reference Iδ_href and the δ-axis current detected value Iδ_fb becomes zero.

Returning to FIG. 1, an explanation of the control unit 12 is continued. The decoupling controller 27 generates a γ-axis interference voltage Vγ_dcp and a δ-axis interference voltage Vδ_dcp that cancel the effect of the γ-axis current component and the δ-axis current component each interfering with the other current component as the δ-axis voltage and the γ-axis voltage.

Specifically, the γ-axis current reference Iγ_ref, the δ-axis current reference Iδ_ref, and the rotor angular frequency estimated value ωest to be described later are input to the decoupling controller 27 and the decoupling controller 27 obtains the γ-axis interference voltage Vγ_dcp and the δ-axis interference voltage Vδ_dcp by the following Equation (3):

$$V\gamma\_dcp = -\omega est \times Lq \times I\delta\_ref$$

$$V\delta\_dcp = \omega est \times Ld \times I\gamma\_ref \quad (3)$$

where Lq is the q-axis inductance of the AC motor 3 and Ld is the d-axis inductance of the AC motor 3. Lq may be set equal to $L_{MTPA}$ and Ld may be set equal to Ld*, or Lq may be set equal to $L_{MTPA}$ and Ld may be set equal to $L_{MTPA}$, on the basis of the inductance compensation value $L_{MTPA}$ output from the speed and magnetic pole position estimator 33 to be described later.

The adder 28 generates a γ-axis voltage reference Vγ_ref and a δ-axis voltage reference Vδ_ref by adding the output of the decoupling controller 27, the output of the current controller 25, and the output of the high-frequency current controller 26. The γδ-axis voltage references Vγ_ref and Vδ_ref are output to the PWM calculator 29, the maximum torque controller 31, and the speed and magnetic pole position estimator 33 from the adder 28.

Specifically, the adder 28 generates the γ-axis voltage reference Vγ_ref by adding the γ-axis interference voltage Vγ_dcp, the γ-axis voltage reference Vγ, and the γ-axis voltage reference Vγ_href. Moreover, the adder 28 generates the δ-axis voltage reference Vδ_ref by adding the δ-axis interference voltage Vδ_dcp, the δ-axis voltage reference Vδ, and the δ-axis voltage reference Vδ_href.

The PWM calculator 29 performs rotating coordinate conversion on the γ-axis voltage reference Vγ_ref and the δ-axis voltage reference Vδ_ref by using rotor position estimated value θest and furthermore performs two-phase to three-phase conversion to generate voltage references Vu, Vv, and Vw corresponding to the U phase, V phase, and W phase, respectively. Then, the PWM calculator 29 generates a drive signal that drives the switching elements of the inverter unit 10b by a method, such as a triangular wave comparison, on the basis of the voltage references Vu, Vv, and Vw and supplies the drive signal to the inverter unit 10b. Consequently, the voltage corresponding to the voltage references Vu, Vv, and Vw is output to the AC motor 3 from the inverter unit 10b.

The output current values Iu, Iv, and Iw output from the output current detecting unit 11 are input to the coordinate converter 30 and the coordinate converter 30 performs coordinate conversion to the γ-δ axis coordinate system by using the rotor position estimated value θest after performing two-phase to three-phase conversion on the output current values Iu, Iv, and Iw. The γ-δ axis coordinate system is a rotating coordinate system that rotates in synchronization with the rotor angular frequency estimated value ωest.

The coordinate converter 30 obtains the γ-axis current detected value Iγ_fb, which is a γ-axis component, and the δ-axis current detected value Iδ_fb, which is a δ-axis component, by the coordinate conversion to the γ-δ axis coordinate system and outputs them to each of the subtractor 24, the maximum torque controller 31, the inductance calculator 32, and the speed and magnetic pole position estimator 33.

The maximum torque controller 31 obtains a phase change amount $\Delta\theta_{MTPA}$ on the basis of the γδ-axis current detected values Iγ_fb and Iδ_fb, the γδ-axis voltage references Vγ_ref and Vδ_ref, and a signal sin(fh×2π), which has a frequency and a phase same as those of the injection signal $S_{mag}$. The phase change amount $\Delta\theta_{MTPA}$ is a phase change amount of the current reference vector Is after the control is started and is output to the inductance calculator 32.

The maximum torque controller 31 obtains the phase change amount $\Delta\theta_{MTPA}$ on the basis of a motor input power Pe. Specifically, the γδ-axis current detected values Iγ_fb and Iδ_fb and the γδ-axis voltage references Vγ_ref and Vδ_ref are input to the maximum torque controller 31 and the maximum torque controller 31 obtains the motor input power Pe that is the power input from the power converting unit 10 to the AC motor 3 by the following Equation (4).

$$Pe = V\gamma\_ref \times I\gamma\_fb + V\delta\_ref \times I\delta\_fb \quad (4)$$

The motor input power Pe includes a copper loss Pc due to the winding resistance of the AC motor 3 and a component of a reactive power Pr in addition to a motor output power $P_{mecha}$ that is a mechanical output of the AC motor 3. The copper loss Pc includes only a DC component. Moreover, the reactive power Pr includes a frequency component whose frequency is the same as that of the injection signal $S_{mag}$ and a frequency component whose frequency is twice that of the injection signal $S_{mag}$. The component whose frequency is the same as that of the injection signal $S_{mag}$ is out of phase by π/2 with respect to the phase of the injection signal $S_{mag}$. On the other hand, the motor output power $P_{mecha}$ includes a component whose frequency and phase are the same as those of the injection signal $S_{mag}$.

Figure 3:
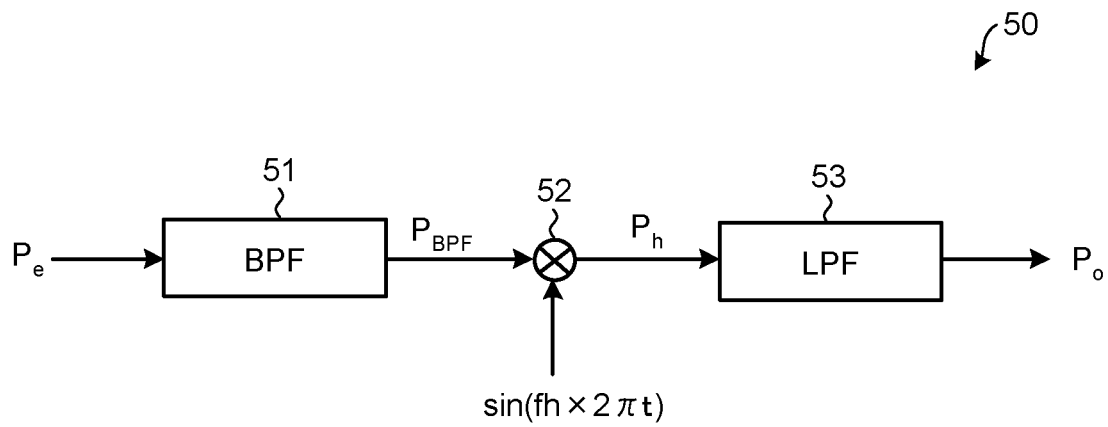
FIG. 3 is a diagram illustrating a configuration of a motor output extracting unit included in a maximum torque controller.

The maximum torque controller 31 extracts a motor output power fluctuation range Po, which is the amplitude value of a component whose frequency and phase are the same as those of the injection signal $S_{mag}$, in the motor output power $P_{mecha}$ from the motor input power Pe by a motor output extracting unit 50 illustrated in FIG. 3. FIG. 3 is a diagram illustrating the configuration of the motor output extracting unit 50 included in the maximum torque controller 31.

As illustrated in FIG. 3, the motor output extracting unit 50 includes a band-pass filter (BPF) 51, a multiplier 52, and a low-pass filter (LPF) 53. The BPF 51 is set to pass a signal of the frequency fh and extracts a frequency component $P_{BPF}$, whose frequency is the same as that of the injection signal $S_{mag}$, from the input motor input power Pe.

The output of the BPF 51 is input to the multiplier 52 and is multiplied by a signal sin(fh×2πt) whose frequency and phase are the same as those of the injection signal $S_{mag}$. Consequently, the signal, whose frequency and phase are the same as those of the injection signal $S_{mag}$, in the output of the BPF 51 becomes a DC component and a signal Ph, which includes this DC component, is output from the multiplier 52.

The signal Ph output from the multiplier 52 is input to the LPF 53, and only the DC component is extracted in the LPF 53 and is output from the LPF 53. This DC component is a component that corresponds to the motor output power fluctuation range Po. The motor output power fluctuation range Po can be represented by the following Equation (5):

$$Po = \frac{3}{4} \omega r \times Amag \times Isa \times \left\{ \begin{array}{c} (Ld - Lq) \times Isa \times \\ \cos(2\theta avg) + \lambda f \times \cos(\theta avg) \end{array} \right\} \quad (5)$$

where ωr is the rotor angular velocity, Isa is the current amplitude of the current reference vector Is, πf is the flux linkage constant, Ld is the d-axis inductance, Lq is the q-axis inductance, and θavg is the phase of the current reference vector Is. In the present embodiment, the γ-axis current reference I_γref is equal to zero; therefore, θavg is the phase of the δ-axis.

On the other hand, a change ∂Te/∂θ of a motor generated torque Te with respect to the phase variation of the current reference vector Is is represented by the following Equation (6):

$$\frac{\partial Te}{\partial \theta} = \frac{3P}{4} \times Amag \times Isa \times \left\{ \begin{array}{c} (Ld - Lq) \times Isa \times \\ \cos 2\theta + \lambda f \times \cos \theta \end{array} \right\} \quad (6)$$

where P is the number of motor poles, λf is the flux linkage constant, and Ld and Lq are the d-axis inductance and the q-axis inductance, respectively. Isa is the magnitude of the current reference vector Is and θ is the phase of the current reference vector Is of the AC motor 3.

Comparing the Equation (5) and the Equation (6), it is found that the motor output power fluctuation range Po is proportional to the change ∂Te/∂θ of the motor generated torque Te with respect to the phase variation of the current reference vector Is. Therefore, the phase of the current reference vector Is in which the motor output power fluctuation range Po becomes zero becomes the maximum torque axis. In the motor control apparatus 1 in the present embodiment, the motor output power fluctuation range Po is estimated as the change ∂Te/∂θ of the output torque Te of the AC motor 3 with respect to the current phase change.

The maximum torque controller 31 includes a phase-change-amount estimating unit that detects the phase change amount $\Delta\theta_{MTPA}$ of the current reference vector Is at which the motor output power fluctuation range Po becomes a setting value Po* of the motor output power fluctuation range. The phase change amount $\Delta\theta_{MTPA}$ is a phase change amount of the current reference vector Is after the control is started and is a phase change amount that causes the δ-axis to match the maximum torque axis in a steady state. The current phase when the control is started is a phase obtained when the inductance value set in the motor control apparatus 1 as an initial value is used for calculation in an extended electromotive force observer 80 to be described later. The setting value Po* of the motor output power fluctuation range is normally set to zero or near zero; however, it can also be set to other values.

Figure 4:
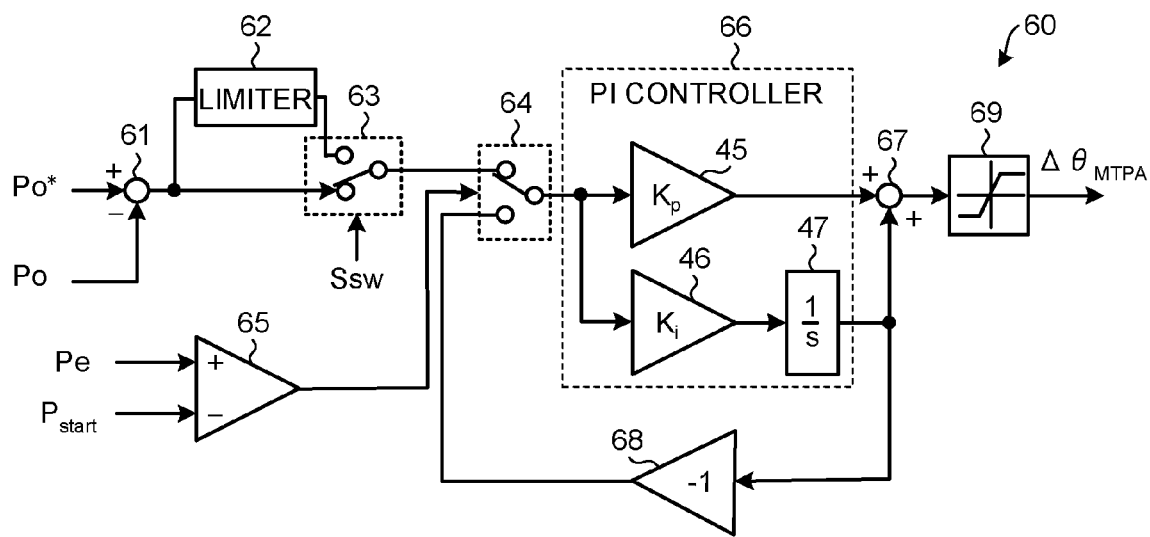
FIG. 4 is a diagram illustrating a configuration of a phase-change-amount estimating unit included in the maximum torque controller.

FIG. 4 is a diagram illustrating the configuration of a phase-change-amount estimating unit 60 included in the maximum torque controller 31. As illustrated in FIG. 4, the phase-change-amount estimating unit 60 includes a subtractor 61, a limiter 62, switches 63 and 64, a comparator 65, a PI controller 66, an adder 67, an amplifier 68, and a limiter 69.

The subtractor 61 subtracts the motor output power fluctuation range Po from the setting value Po* of the motor output power fluctuation range and outputs the subtraction result to the limiter 62 and the switch 63. The limiter 62 is a lower limiter. If the subtraction result of the subtractor 61 is less than zero, the limiter 62 outputs zero to the switch 63, and, if the subtraction result of the subtractor 61 is equal to or more than zero, the limiter 62 directly outputs the subtraction result of the subtractor 61 to the switch 63.

The switch 63 is controlled by a reference signal $S_{SW}$ to be described later, which is output from the inductance calculator 32, and selects and outputs one of the output of the subtractor 61 and the output of the limiter 62 to the switch 64. Specifically, when the reference signal $S_{SW}$ is at a low level, the switch 63 selects the output of the subtractor 61 and outputs it to the switch 64, and, when the reference signal $S_{SW}$ is at a high level, the switch 63 selects the output of the limiter 62 and outputs it to the switch 64.

If the inductance compensation value $L_{MTPA}$ reaches the limit value of a limiter 78 (see FIG. 5), the reference signal $S_{SW}$ is output as a signal at a high level. In this case, if the result obtained by subtracting the motor output power fluctuation range Po from the setting value Po* of the motor output power fluctuation range is negative, zero is input to the PI controller 66 by the limiter 62 and the switch 63. Therefore, updating of the integrated value in the PI controller 66 is stopped and updating of the phase change amount $\Delta\theta_{MTPA}$ is stopped.

The switch 64 selects one of the output of the switch 63 and the output of the amplifier 68 on the basis of the output of the comparator 65 and outputs it to the PI controller 66. The comparator 65 controls the switch 64 by comparing a start power $P_{start}$ with the motor input power Pe. If the motor input power Pe is less than the start power $P_{start}$, a signal at a low level is output from the comparator 65. If the motor input power Pe is equal to or more than the start power $P_{start}$, a signal at a high level is output from the comparator 65. The comparator 65 may compare the start power $P_{start}$ with the motor output power fluctuation range Po instead of the motor input power Pe.

When a signal at a low level is output from the comparator 65, the switch 64 selects the output of the amplifier 68, which inverts the integrated output of the PI controller 66, and outputs the output of the amplifier 68 to the PI controller 66. Therefore, in a state where the motor input power Pe is less than the start power P$_{start}$, the signal, which is obtained by inverting the integrated output of the PI controller 66, is output to the PI controller 66. Consequently, the output of the phase-change-amount estimating unit 60 is attenuated or maintained at zero by the set time constant of the PI controller 66.

Therefore, in an area in which the electric energy is small, the estimation operation of the phase change amount $\Delta\theta_{MTPA}$ by the phase-change-amount estimating unit 60 is stopped and the phase change amount $\Delta\theta_{MTPA}$ output from the phase-change-amount estimating unit 60 becomes zero or converges to zero. The motor output power fluctuation range Po is calculated from the motor input power Pe; therefore, the motor output power fluctuation range Po is largely affected by the detection accuracy of the output current detecting unit 11 and the output voltage error. Thus, in an area in which the electric energy is small, the accuracy of the motor output power fluctuation range Po degrades.

Therefore, in the maximum torque controller 31, in an area in which the electric energy is small, the operation of the phase-change-amount estimating unit 60 stops. Consequently, the low accuracy phase change amount $\Delta\theta_{MTPA}$ can be prevented from being output from the phase-change-amount estimating unit 60. It is desirable that the start power P$_{start}$ be determined, for example, to a value (for example, about 10% of the motor rated capacity), at which the calculation accuracy of the motor output power fluctuation range Po starts to degrade with the motor rated capacity as a reference.

On the other hand, when a signal at a high level is output from the comparator 65, the switch 64 selects the output of the switch 63. Therefore, in a state where the motor input power Pe is equal to or more than the start power P$_{start}$, the output of the switch 63 is output to the PI controller 66.

The PI controller 66 includes an amplifier 45 of a proportional gain Kp, an amplifier 46 of an integral gain Ki, and an integrator 47. The output of the switch 64 is multiplied by Kp by the amplifier 45 and is output to the adder 67. Moreover, the output of the switch 64 is multiplied by Ki by the amplifier 46, is integrated by the integrator 47, and is output to the adder 67.

The adder 67 adds the output of the amplifier 45 and the output of the integrator 47 and outputs the addition result to the limiter 69. The limiter 69 limits the output from the phase-change-amount estimating unit 60 within a predetermined range. In other words, if the output of the adder 67 is within the predetermined range, the limiter 69 outputs the output of the adder 67 directly as the phase change amount $\Delta\theta_{MTPA}$, and, if the output of the adder 67 is out of the predetermined range, the limiter 69 outputs the upper limit or the lower limit of the predetermined range as the phase change amount $\Delta\theta_{MTPA}$. The output of the integrator 47 is inverted by the amplifier 68 and is output to the switch 64.

Returning to FIG. 1, an explanation of the control unit 12 is continued. The inductance calculator 32 illustrated in FIG. 1 obtains the inductance compensation value L$_{MTPA}$ from the phase change amount $\Delta\theta_{MTPA}$ of the current reference vector Is output from the maximum torque controller 31 by the following Equation (7). The following Equation (7) can be derived by modifying the above Equation (5) by using the relationship of $\theta avg=\Delta\theta_{MTPA}+\pi/2$.

$$L_{MTPA} = \frac{\lambda f \times \sin\Delta\theta_{MTPA}}{Isa \times \cos 2\Delta\theta_{MTPA}} + L_d^* \quad (7)$$

The inductance calculator 32 outputs the inductance compensation value L$_{MTPA}$ obtained as above to the speed and magnetic pole position estimator 33 and the high-frequency current controller 26. In the above Equation (7), the d-axis inductance Ld* and the flux linkage constant $\lambda f$ are constants set in the motor control apparatus 1 and are, for example, values determined from offline tuning, in which the motor control apparatus 1 is in a non-operating state, or the information on a motor test report.

Figure 5:
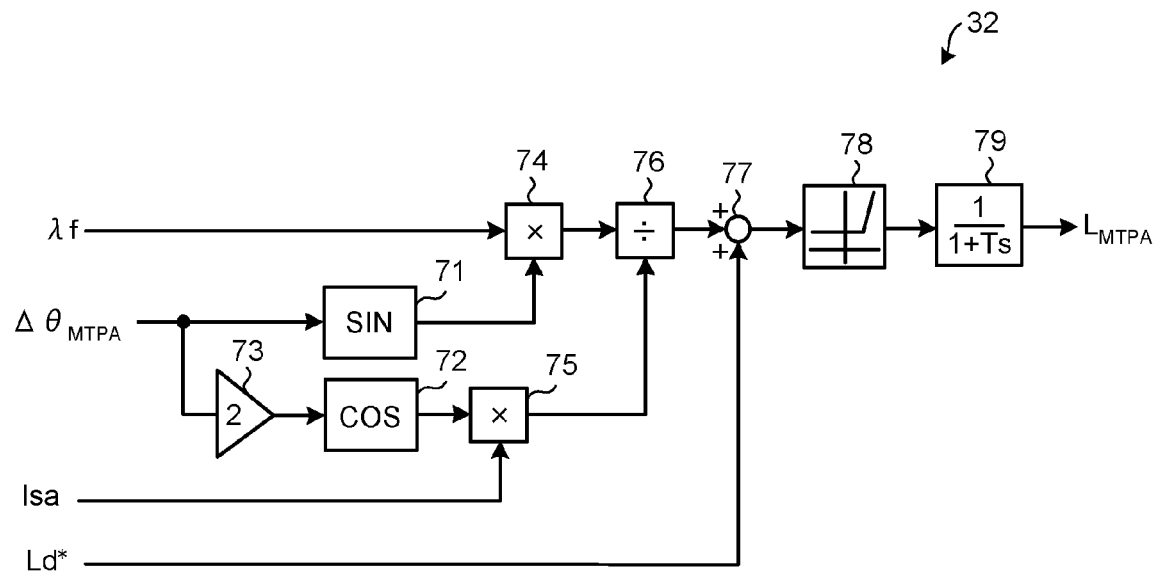
FIG. 5 is a diagram illustrating a configuration example of an inductance calculator.

FIG. 5 is a diagram illustrating a configuration example of the inductance calculator 32. As illustrated in FIG. 5, the inductance calculator 32 includes a sine value calculator 71, a cosine value calculator 72, an amplifier 73, multipliers 74 and 75, a divider 76, an adder 77, the limiter 78, and a filter 79.

The sine value calculator 71 calculates a sine value of the phase change amount $\Delta\theta_{MTPA}$. A calculation result sin $\Delta\theta_{MTPA}$ is multiplied by the flux linkage constant $\lambda f$ by the multiplier 74. The calculation result of the multiplier 74 is output to the divider 76.

The cosine value calculator 72 calculates a cosine value of the phase change amount $\Delta\theta_{MTPA}$ doubled by the amplifier 73. The calculation result cos $2\Delta\theta_{MTPA}$ is multiplied by a current amplitude Isa of the current reference vector Is by the multiplier 75. The calculation result of the multiplier 75 is output to the divider 76.

The divider 76 divides the calculation result of the multiplier 74 by the calculation result of the multiplier 75. The calculation result of the divider 76 is output to the adder 77 and the d-axis inductance Ld* is added thereto by the adder 77. The addition result of the adder 77 is output via the limiter 78 and the filter 79.

If the phase change amount $\Delta\theta_{MTPA}$ of the current reference vector Is after the control is started is zero, the inductance compensation value L$_{MTPA}$ becomes equal to Ld*. The inductance compensation value L$_{MTPA}$ is updated on the basis of the phase change amount $\Delta\theta_{MTPA}$ output from the maximum torque controller 31 and is output to the high-frequency current controller 26 and the speed and magnetic pole position estimator 33.

A lower limit is set in the limiter 78 to prevent overcompensation. When the inductance compensation value L$_{MTPA}$ reaches the lower limit, the limiter 78 outputs the reference signal S$_{SW}$ at a high level to the switch 63 as an antiwindup operation. Consequently, the switch 63 of the phase-change-amount estimating unit 60 illustrated in FIG. 4 is switched and the output of the limiter 62 is output from the switch 63.

The limiter 78 compares the input and output signals of the limiter 78. If the signals are different from each other, the limiter 78 determines that the inductance compensation value L$_{MTPA}$ reaches the lower limit. Moreover, the lower limit is, for example, set to a value that is a half of the d-axis inductance Ld* so that the inductance compensation value L$_{MTPA}$ does not become smaller than the value that is a half of the d-axis inductance Ld*.

Returning to FIG. 1, an explanation of the control unit 12 is continued. The speed and magnetic pole position estimator 33 detects the rotational speed and the magnetic pole position of the rotor of the AC motor 3. Specifically, the $\gamma\delta$-axis voltage references V$\gamma$_ref and V$\delta$_ref, the $\gamma\delta$-axis current detected values I$\gamma$_fb and I$\delta$_fb, and the inductance compensation value L$_{MTPA}$ are input to the speed and magnetic pole position estimator 33, and the speed and magnetic pole position estimator 33 obtains the rotor angular frequency estimated value ωest and the rotor position estimated value θest. The speed and magnetic pole position estimator 33 outputs the rotor angular frequency estimated value ωest to the subtractor 20 and outputs the rotor position estimated value θest to the PWM calculator 29 and the coordinate converter 30.

Figure 6:
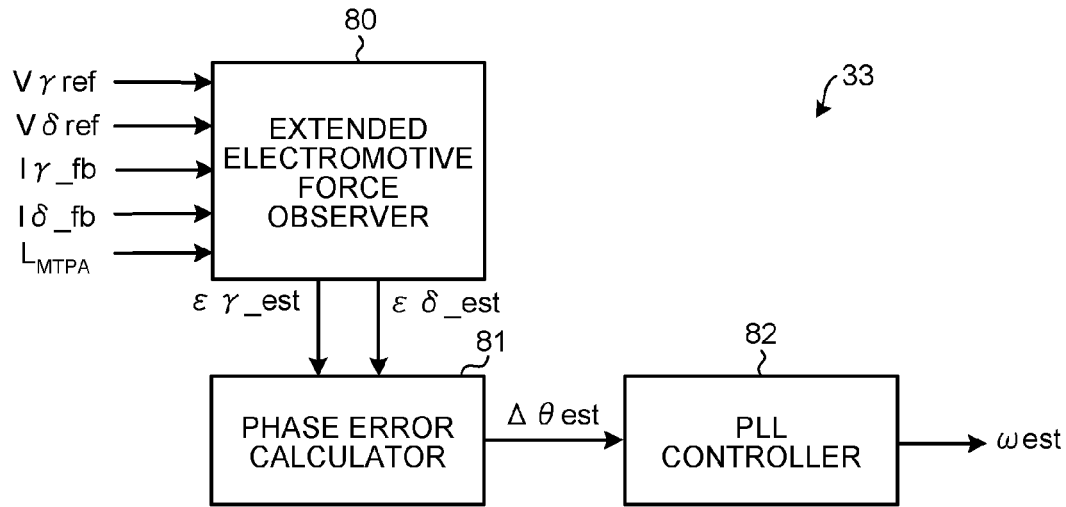
FIG. 6 is a diagram illustrating a configuration example of a speed and magnetic pole position estimator.

FIG. 6 is a diagram illustrating a configuration example of the speed and magnetic pole position estimator 33. As illustrated in FIG. 6, the speed and magnetic pole position estimator 33 includes the extended electromotive force observer 80, a phase error calculator 81, and a PLL controller 82.

The extended electromotive force observer 80 obtains a γ-axis extended electromotive force estimated value $\epsilon\gamma\_est$ and a δ-axis extended electromotive force estimated value $\epsilon\delta\_est$, for example, by the following Equation (8):

$$\frac{d}{dt}\begin{bmatrix} I_{\gamma\_est} \\ I_{\delta\_est} \\ \varepsilon_{\gamma\_est} \\ \varepsilon_{\delta\_est} \end{bmatrix} = \begin{bmatrix} -\frac{R_s}{L_d} & \omega_{est}\frac{L_q}{L_d} & -\frac{1}{L_d} & 0 \\ -\omega_{est}\frac{L_q}{L_d} & -\frac{R_s}{L_d} & 0 & -\frac{1}{L_d} \\ 0 & 0 & 0 & 0 \\ 0 & 0 & 0 & 0 \end{bmatrix} \begin{bmatrix} I_{\gamma\_est} \\ I_{\delta\_est} \\ \varepsilon_{\gamma\_est} \\ \varepsilon_{\delta\_est} \end{bmatrix} + \begin{bmatrix} \frac{1}{L_d} & 0 \\ 0 & \frac{1}{L_d} \\ 0 & 0 \\ 0 & 0 \end{bmatrix} \begin{bmatrix} V_{\gamma\_ref} \\ V_{\delta\_ref} \end{bmatrix} + \begin{bmatrix} H_1 & H_2 \\ H_3 & H_4 \\ H_5 & H_6 \\ H_7 & H_8 \end{bmatrix} \begin{bmatrix} I_\gamma - I_{\gamma\_est} \\ I_\delta - I_{\delta\_est} \end{bmatrix} \quad (8)$$

where Rs, Ld, and Lq are motor parameters that are calculation parameters. Rs is the primary resistance. Ld is the d-axis inductance. Lq is the q-axis inductance. $H_1$ to $H_9$ are the observer gains. The following Equation (9) can be obtained by developing the above Equation (8) into a discrete system. In the following Equation (9), Ts represents the sampling time.

$$\begin{bmatrix} I_{\gamma\_est}(k+1) \\ I_{\delta\_est}(k+1) \\ \varepsilon_{\gamma\_est}(k+1) \\ \varepsilon_{\delta\_est}(k+1) \end{bmatrix} = \begin{bmatrix} I_{\gamma\_est}(k) \\ I_{\delta\_est}(k) \\ \varepsilon_{\gamma\_est}(k) \\ \varepsilon_{\delta\_est}(k) \end{bmatrix} + T_s\begin{bmatrix} -\frac{R_s}{L_d} & \omega_{est}(k)\frac{L_q}{L_d} & -\frac{1}{L_d} & 0 \\ -\omega_{est}(k)\frac{L_q}{L_d} & -\frac{R_s}{L_d} & 0 & -\frac{1}{L_d} \\ 0 & 0 & 0 & 0 \\ 0 & 0 & 0 & 0 \end{bmatrix}\begin{bmatrix} I_{\gamma\_est}(k) \\ I_{\delta\_est}(k) \\ \varepsilon_{\gamma\_est}(k) \\ \varepsilon_{\delta\_est}(k) \end{bmatrix} + T_s\begin{bmatrix} \frac{1}{L_d} & 0 \\ 0 & \frac{1}{L_d} \\ 0 & 0 \\ 0 & 0 \end{bmatrix}\begin{bmatrix} V_{\gamma\_ref} \\ V_{\delta\_ref} \end{bmatrix} + T_s\begin{bmatrix} H_1 & H_2 \\ H_3 & H_4 \\ H_5 & H_6 \\ H_7 & H_8 \end{bmatrix}\begin{bmatrix} I_\gamma(k) - I_{\gamma\_est}(k) \\ I_\delta(k) - I_{\delta\_est}(k) \end{bmatrix} \quad (9)$$

As represented by the above Equation (9), the extended electromotive force observer 80 obtains the γδ-axis extended electromotive force estimated values $\epsilon\delta\_est$ and $\epsilon\delta\_est$ at ([k+1]·Ts) seconds on the basis of the γδ-axis current detected values Iγ_fb and Iδ_fb, γδ-axis current estimated values Iγ_est and Iδ_est, the γδ-axis extended electromotive force estimated values $\epsilon\gamma\_est$ and $\epsilon\delta\_est$, the speed estimated value, and the motor parameters at (k·Ts) seconds.

At this time, the extended electromotive force observer 80 obtains the γδ-axis extended electromotive force estimated values $\epsilon\gamma\_est$ and $\epsilon\delta\_est$ by using the inductance compensation value $L_{MTPA}$ obtained by the inductance calculator 32 as the q-axis inductance Lq. The extended electromotive force observer 80 selectively performs a first estimation process and a second estimation process on the basis of the setting from the outside.

In the first estimation process, the γδ-axis extended electromotive force estimated values $\delta\gamma\_est$ and $\epsilon\delta\_est$ are obtained by setting Lq to be equal to $L_{MTPA}$ and setting Ld to be equal to Ld* in the above Equation (9). On the other hand, in the second estimation process, the γδ-axis extended electromotive force estimated values $\epsilon\gamma\_est$ and $\epsilon\delta\_est$ are obtained by setting Lq to be equal to $L_{MTPA}$ and setting Ld to be equal to $L_{MTPA}$ in the above Equation (9).

The γδ-axis extended electromotive force estimated values $\epsilon\gamma\_est$ and $\epsilon\delta\_est$ are input to the phase error calculator 81 from the extended electromotive force observer 80 and the phase error calculator 81 obtains a phase error estimated value Δθest by the following Equation (10) and outputs it to the PLL controller 82.

$$\Delta\theta_{est} = \tan^{-1}\left(\frac{-\varepsilon_{\gamma\_est}}{\varepsilon_{\delta\_est}}\right) \quad (10)$$

As represented by the above Equation (9), the γδ-axis extended electromotive force estimated values $\epsilon\gamma\_est$ and $\epsilon\delta\_est$ include a voltage error component generated due to the change of speed, the change in the load state, and the parameter error. On the basis of the γδ-axis extended electromotive force estimated values $\epsilon\gamma\_est$ and $\epsilon\delta\_est$ including the voltage error component, the phase error estimated value Δθest is obtained as represented by the above Equation (10). Therefore, it is found that the inductance compensation value $L_{MTPA}$ obtained by the inductance calculator 32 is reflected in the phase error estimated value Δθest.

Figure 7A:
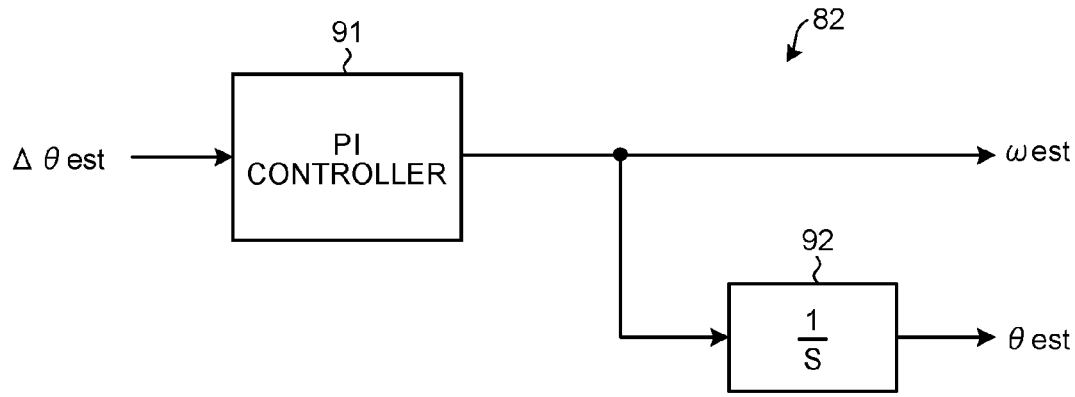
FIG. 7A is a diagram illustrating a configuration example of a PLL controller.
Figure 7B:
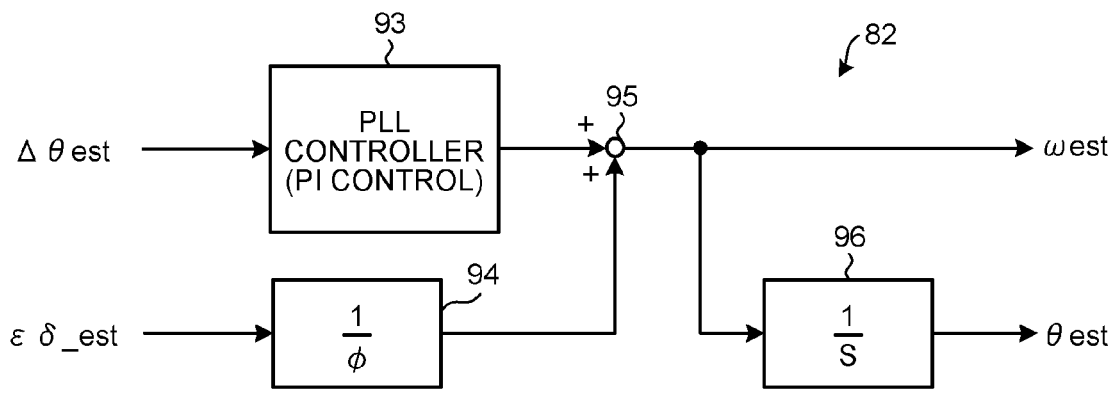
FIG. 7B is a diagram illustrating another configuration example of the PLL controller.

The PLL controller 82 obtains the rotor position estimated value θest and the rotor angular frequency estimated value ωest on the basis of the phase error estimated value Δθest output from the phase error calculator 81. FIG. 7A and FIG. 7B illustrate a configuration example of the PLL controller 82.

In the example illustrated in FIG. 7A, the PLL controller 82 obtains the rotor position estimated value θest and the rotor angular frequency estimated value ωest by controlling such that the phase error estimated value Δθest estimated from the γδ-axis extended electromotive force estimated values $\epsilon\gamma\_est$ and $\epsilon\delta\_est$ becomes zero. Specifically, the PLL controller 82 illustrated in FIG. 7A includes a PI controller 91 and an integrator 92, and obtains the rotor angular frequency estimated value ωest by performing the PI control on the phase error estimated value Δθest by the PI controller 91 and obtains the rotor position estimated value θest by integrating the rotor angular frequency estimated value ωest by the integrator 92.

If there is no parameter error and thus there is no error in the phase error estimated value Δθest, the γ-δ axis coordinates, which are a control coordinate system, can be caused to match the d-q axis coordinates, which are a rotor coordinate system, by controlling the phase error estimated value Δθest to zero. In the present embodiment, parameters do not match true values; therefore, even if the phase error estimated value Δθest is zero in the control, the γ-δ axis coordinates do not match the d-q axis coordinates. The parameters are determined such that the δ-axis matches the maximum torque axis, and, as a result, as in the PLL controller 82 illustrated in FIG. 7A, the δ-axis in the γ-δ axis coordinates, which are a control coordinate system, is controlled to match the maximum torque axis by controlling the phase error estimated value Δθest to zero. Because the current reference vector Is is always on the δ-axis, the maximum torque control can be performed by causing the δ-axis to match the maximum torque axis.

Moreover, the PLL controller 82 may have a configuration illustrated in FIG. 7B. The PLL controller 82 illustrated in FIG. 7B includes a PI controller 93, a divider 94, an adder 95, and an integrator 96. In the PLL controller 82, the speed is approximately estimated by dividing the δ-axis extended electromotive force estimated value εδ_est by an induced voltage constant φ by the divider 94, and the rotor angular frequency estimated value ωest is obtained by adding the estimated speed to the output of the PI controller 93 by the adder 95. Moreover, the rotor position estimated value θest is obtained by integrating the rotor angular frequency estimated value ωest by the integrator 96.

Figure 8:
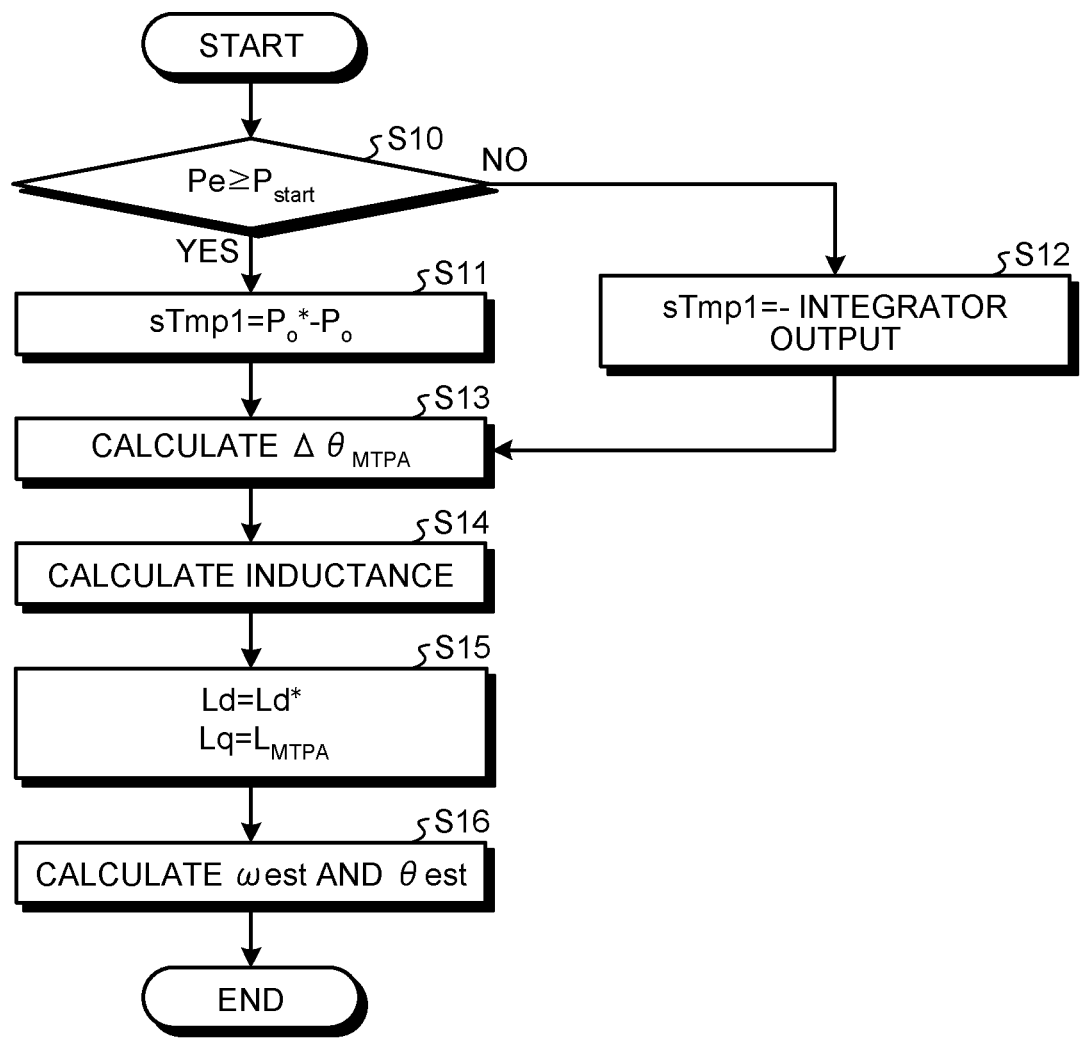
FIG. 8 is a diagram illustrating a flow of a first calculation process of a rotor angular frequency estimated value and a rotor position estimated value.
Figure 9:
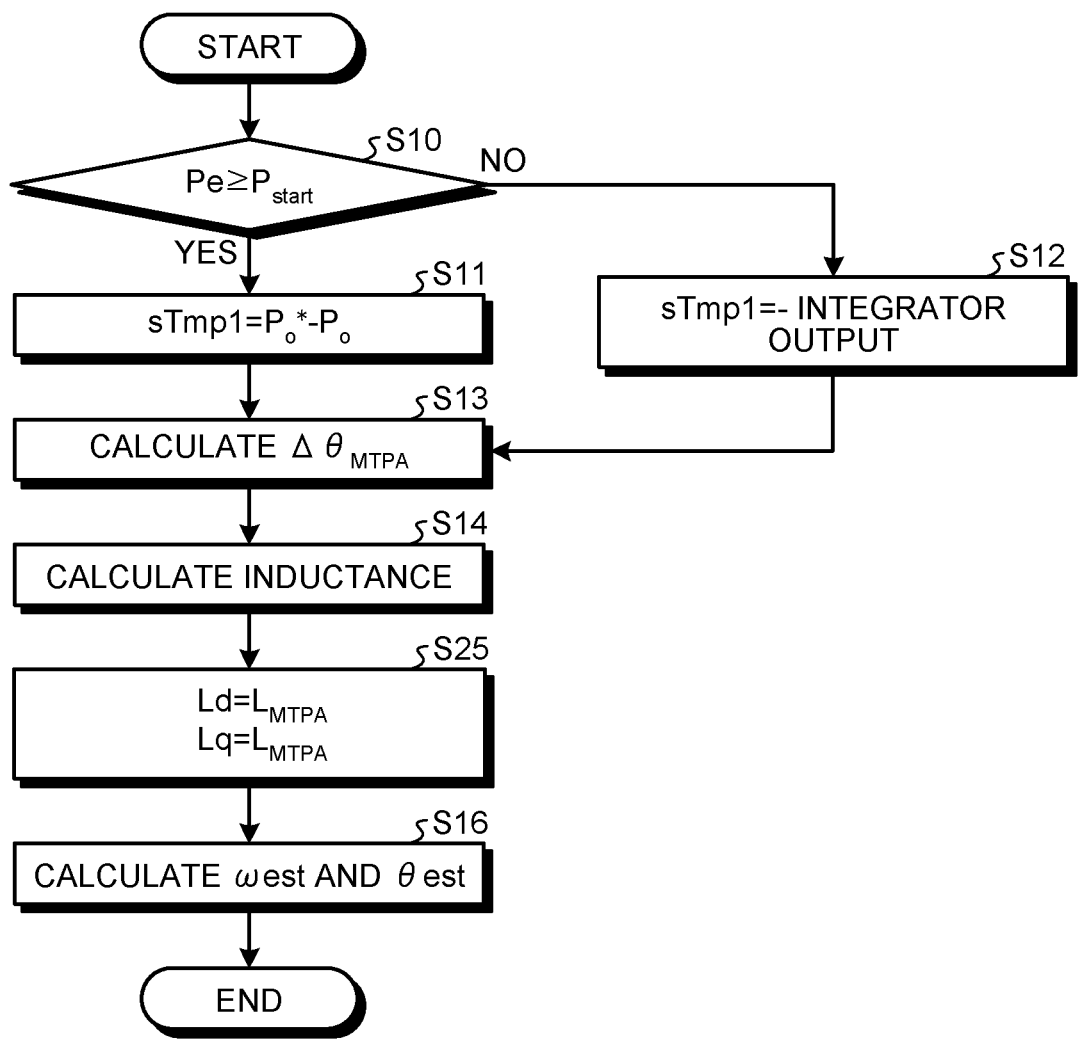
FIG. 9 is a diagram illustrating a flow of a second calculation process of a rotor angular frequency estimated value and a rotor position estimated value.

FIG. 8 and FIG. 9 are diagrams illustrating the flow of the calculation process of the rotor angular frequency estimated value ωest and the rotor position estimated value θest in the control unit 12. FIG. 8 illustrates the flow of the first calculation process in the case where the above-described first estimation process is selected and FIG. 9 illustrates the flow of the second calculation process in the case where the above-described second estimation process is selected.

First, the flow of the first calculation process of the rotor angular frequency estimated value ωest and the rotor position estimated value θest will be described with reference to FIG. 8.

The maximum torque controller 31 of the control unit 12 compares the start power $P_{start}$ with the motor input power Pe (Step S10). If the motor input power Pe is equal to or more than the start power $P_{start}$ (Yes in Step S10), the maximum torque controller 31 sets the target for the PI control to Po-Po* (Step S11). On the other hand, if the motor input power Pe is less than the start power $P_{start}$ (No in Step S10), the maximum torque controller 31 sets the target for the PI control to an inverse of the integral output (Step S12).

The maximum torque controller 31 obtains the phase change amount $\Delta\theta_{MTPA}$ by performing the PI control on the basis of the setting in Steps S11 and S12 (Step S13). Then, the inductance calculator 32 obtains the inductance compensation value $L_{MTPA}$ on the basis of the phase change amount $\Delta\theta_{MTPA}$ output from the maximum torque controller 31 (Step S14).

The speed and magnetic pole position estimator 33 sets the q-axis inductance Lq and the d-axis inductance Ld that are motor parameters. Specifically, the speed and magnetic pole position estimator 33 sets the inductance compensation value $L_{MTPA}$ as the q-axis inductance Lq and sets the d-axis inductance Ld*, which is preset, as the d-axis inductance Ld (Step S15). Then, the speed and magnetic pole position estimator 33 obtains the rotor position estimated value θest and the rotor angular frequency estimated value ωest on the basis of the motor parameters set in Step S15 (Step S16).

Next, the flow of the second calculation process of the rotor angular frequency estimated value ωest and the rotor position estimated value θest will be described with reference to FIG. 9. In this process, the processes in Steps S11 to S14 and S16 are the same as those in the first calculation process illustrated in FIG. 8 and the process in Step S25 is different from that in the first calculation process.

In Step S25, the speed and magnetic pole position estimator 33 sets the inductance compensation value $L_{MTPA}$ as the q-axis inductance Lq and sets the inductance compensation value $L_{MTPA}$ as the d-axis inductance Ld. Then, the speed and magnetic pole position estimator 33 obtains the rotor position estimated value θest and the rotor angular frequency estimated value ωest in accordance with the motor parameters set as above.

As described above, the motor control apparatus 1 according to the present embodiment includes the maximum torque controller 31, the inductance calculator 32, and the speed and magnetic pole position estimator 33. The maximum torque controller 31 estimates the motor output power fluctuation range Po of the AC motor 3 corresponding to the injection signal $S_{mag}$ that is a high frequency signal whose frequency is higher than that of the drive frequency of the AC motor 3. The inductance calculator 32 estimates the inductance compensation value $L_{MTPA}$ that obtains the maximum torque on the basis of the motor output power fluctuation range Po and sets it in the speed and magnetic pole position estimator 33 as the q-axis inductance. The speed and magnetic pole position estimator 33 estimates the rotor position estimated value θest, which is the rotational position of the rotor of the AC motor 3, from the motor parameters that include the q-axis inductance Lq set by the inductance calculator 32 on the basis of the γδ-axis current detected values Iγ_fb and Iδ_fb, which are detected values of the output current to the AC motor 3, and the γδ-axis voltage references Vγ_ref and Vδ_ref.

The motor control apparatus 1 according to the present embodiment can set the q-axis inductance in which an error is intentionally induced from its true value by obtaining the inductance compensation value $L_{MTPA}$ to be set as the q-axis inductance online without using a fixed value and motor parameters (Ld, Lq, and Φa). Therefore, for example, even if there is an error in the motor parameters or variation in the motor parameters, the speed and magnetic pole position estimator 33 can be stably operated and thus the maximum torque control can be accurately performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A motor control apparatus comprising:
a current reference generating unit that generates a current reference, on which a high frequency signal whose frequency is higher than a drive frequency of a motor is superposed;
a drive unit that drives the motor on a basis of a voltage reference;
a current detecting unit that detects an output current to the motor from the drive unit;
a voltage reference generating unit that generates the voltage reference on a basis of a deviation between the current reference and the output current;
a rotational position estimating unit that estimates a rotational position of a rotor of the motor from a calculation parameter including a q-axis inductance of the motor on a basis of the output current and the voltage reference;

a change amount estimating unit that estimates a change amount of an output torque with respect to a current phase change of the motor corresponding to the high frequency signal; and an inductance estimating unit that estimates an inductance value that obtains a maximum torque on a basis of the change amount and sets the inductance value in the rotational position estimating unit as the q-axis inductance.

2. The motor control apparatus according to claim 1, further comprising a phase-change-amount estimating unit that estimates a phase change amount of a current vector of the output current such that the change amount becomes a target value, wherein the inductance estimating unit estimates the inductance value on a basis of the phase change amount.

3. The motor control apparatus according to claim 1, wherein the change amount estimating unit estimates the change amount on a basis of an amplitude of a frequency component same as the high frequency signal in a frequency component of a mechanical output of a motor.

4. The motor control apparatus according to claim 1, wherein the change amount estimating unit stops estimation of the change amount until an input power to the motor or an output power of the motor becomes a predetermined value, and performs estimation of the change amount after the input power or the output power becomes equal to or more than the predetermined value.

5. The motor control apparatus according to claim 1, wherein the inductance estimating unit includes a limiter that limits estimated inductance value such that the estimated inductance value does not become smaller than a predetermined value.

6. The motor control apparatus according to claim 1, wherein the calculation parameter includes a d-axis inductance of the motor, and the inductance estimating unit sets the inductance value in the rotational position estimating unit as the d-axis inductance.

7. The motor control apparatus according to claim 1, further comprising an angular frequency estimating unit that estimates an angular frequency of the rotor from the calculation parameter on a basis of the output current and the voltage reference.

8. The motor control apparatus according to claim 1, wherein the current reference generating unit sets a flux direction for control corresponding to a d-axis, which is a flux direction generated by a permanent magnet, as a γ-axis and sets a current reference of the γ-axis to zero.

9. A motor control apparatus comprising:

a means for generating a current reference, on which a high frequency signal whose frequency is higher than a drive frequency of a motor is superposed;

a means for driving the motor on a basis of a voltage reference;

a means for detecting an output current to the motor;

a means for generating the voltage reference on a basis of a deviation between the current reference and the output current;

a means for estimating a rotational position of a rotor of the motor from a calculation parameter including a q-axis inductance of the motor on a basis of the output current and the voltage reference;

a means for estimating a change amount of an output torque with respect to a current phase change of the motor corresponding to the high frequency signal; and an means for estimating an inductance value that obtains a maximum torque on a basis of the change amount and setting the inductance value as the q-axis inductance.

10. A motor control method comprising:

generating a current reference, on which a high frequency signal whose frequency is higher than a drive frequency of a motor is superposed;

driving the motor on a basis of a voltage reference;

detecting an output current to the motor;

generating the voltage reference on a basis of a deviation between the current reference and the output current;

estimating a rotational position of a rotor of the motor from a calculation parameter including a q-axis inductance of the motor on a basis of the output current and the voltage reference;

estimating a change amount of an output torque with respect to a current phase change of the motor corresponding to the high frequency signal; and estimating an inductance value that obtains a maximum torque on a basis of the change amount and setting the inductance value as the q-axis inductance.

* * * * *